(12) United States Patent
Miyata et al.

(10) Patent No.: US 8,236,869 B2
(45) Date of Patent: Aug. 7, 2012

(54) POLYETHER POLYOL, RIGID POLYURETHANE FOAM AND PROCESSES FOR PRODUCTION THEREOF

(75) Inventors: Atsushi Miyata, Ichihara (JP); Tomoki Tsutsui, Ichihara (JP); Nobuhito Koga, Yokohama (JP); Shinsuke Matsumoto, Ichihara (JP); Kazuhiko Ohkubo, Yokohama (JP)

(73) Assignee: Mitsui Chemicals, Inc., Tokyo (JP)

( * ) Notice: Subject to any disclaimer, the term of this patent is extended or adjusted under 35 U.S.C. 154(b) by 288 days.

(21) Appl. No.: 12/312,128

(22) PCT Filed: Oct. 25, 2007

(86) PCT No.: PCT/JP2007/070832
§ 371 (c)(1),
(2), (4) Date: Apr. 27, 2009

(87) PCT Pub. No.: WO2008/053780
PCT Pub. Date: May 8, 2008

(65) Prior Publication Data
US 2010/0029799 A1 Feb. 4, 2010

(30) Foreign Application Priority Data

Oct. 31, 2006 (JP) ................................. 2006-295658

(51) Int. Cl.
*C08G 18/28* (2006.01)
*C07C 41/01* (2006.01)

(52) U.S. Cl. ........ 521/174; 568/579; 568/606; 568/613; 568/622; 568/623

(58) Field of Classification Search .................. 521/174; 568/579, 606, 613, 622, 623
See application file for complete search history.

(56) References Cited

U.S. PATENT DOCUMENTS

| | | | |
|---|---|---|---|
| 3,405,077 A | 10/1968 | Pastor et al. | |
| 4,110,268 A * | 8/1978 | Longley et al. | ............... 521/177 |
| 5,338,870 A | 8/1994 | Blytas et al. | |
| 5,371,244 A * | 12/1994 | Blytas | ............... 549/378 |
| 5,654,344 A * | 8/1997 | Falke et al. | ............... 521/49 |
| 6,765,082 B2 | 7/2004 | Sunder et al. | |
| 6,822,068 B2 | 11/2004 | Sunder et al. | |
| 7,528,215 B2 | 5/2009 | Shigematsu et al. | |
| 2003/0017132 A1 | 1/2003 | Li et al. | |
| 2006/0106125 A1 | 5/2006 | Leitner | |

FOREIGN PATENT DOCUMENTS

| | | |
|---|---|---|
| CA | 2356474 A1 | 2/2003 |
| DE | 199 47 631 A1 | 6/2000 |
| EP | 1 659 140 A1 | 5/2006 |
| JP | 58-198429 | 11/1983 |
| JP | 2-172938 A | 7/1990 |
| JP | 5-504062 A | 7/1993 |
| JP | 7-157529 A | 6/1995 |
| JP | 7-216082 A | 8/1995 |
| JP | 2000-239208 A | 9/2000 |
| JP | 2001-187863 A | 7/2001 |
| JP | 2003-252980 A | 9/2003 |
| JP | 2004-359891 A | 12/2004 |
| JP | 2005-133034 A | 5/2005 |
| JP | 2006-282698 A | 10/2006 |
| WO | WO 91/10368 A1 | 7/1991 |
| WO | WO-03/062297 A1 | 7/2003 |
| WO | WO-2004/074346 A1 | 9/2004 |
| WO | WO 2004/101469 A2 | 11/2004 |

OTHER PUBLICATIONS

International Search Report received in International Application No. PCT/JP2007/070832.
Office Action in Korean Appln No. 10-2009-7011218 dated Jul. 27, 2011.
Communication (Supplementary EP Search Report) in EP Appln No. 07830566.1 dated Feb. 2, 2012.

* cited by examiner

*Primary Examiner* — John Cooney
(74) *Attorney, Agent, or Firm* — Foley & Lardner LLP

(57) ABSTRACT

Highly-functionalized, low-viscosity polyether polyols are obtained by dehydration condensation reaction of alcohols. The polyether polyols are obtained by dehydration condensation of glycerin and monohydric and/or dihydric alcohol with the glycerin percentage being more than 50 mol % relative to 100 mol % of the total of the glycerin and alcohol. The glycerin may be crude glycerin obtained by hydrolysis or alcoholysis of natural fat and oils.

10 Claims, No Drawings

POLYETHER POLYOL, RIGID POLYURETHANE FOAM AND PROCESSES FOR PRODUCTION THEREOF

FIELD OF THE INVENTION

The present invention relates to polyether polyols obtained by dehydration condensation of glycerins, rigid polyurethanes obtained from reaction between the polyether polyols and polyisocyanates, and processes for the production thereof.

BACKGROUND OF THE INVENTION

Polyether polyols are used as materials for rigid polyurethane foams. They are conventionally produced by a method of ring-opening polymerization of cyclic ether compounds such as ethylene oxide, propylene oxide or tetrahydrofuran with active hydrogen compounds as initiators. Because the cyclic ether compounds possess high activity, the reaction proceeds under relatively mild conditions. Further, the polyether polyols obtained by this process have narrow molecular weight distribution. However, the cyclic ether compounds have a low boiling point and high toxicity, and this makes the storage and handling thereof during the synthesis difficult.

With respect to polyether polyols obtained from the cyclic ether compounds, the average number of hydroxyl groups cannot be more than the number of active hydrogen atoms in the initiators because of the nature of the reaction. In some cases, the average number of hydroxyl groups can be reduced by side reactions during the reaction. Polyether polyols for rigid polyurethane foams require a large number of hydroxyl groups, and therefore the production thereof should involve hydroxyl-rich initiators such as pentaerythritol, sorbitol or sugars. However, the hydroxyl-rich initiators are frequently solid, and handling thereof as initiators is difficult.

On the other hand, polyether polyols may also be produced by dehydration condensation of alcohols. According to this method, the number of hydroxyl groups per polyether polyol molecule may be theoretically increased by using polyol compounds having three or more hydroxyl groups in the molecule as the alcohol. With respect to the polyether polyols obtained from dehydration condensation of polyol compounds having three of more hydroxyl groups in the molecule, JP-A-H02-172938 and JP-A-H07-216082 disclose polyglycerins obtained by dehydration condensation of glycerins in the presence of alkalis. When polyglycerins are used as polyol components for rigid polyurethane foams, the polyglycerins should have a high degree of condensation. However, the polyglycerins show very high viscosity when the degree of condensation is high. It is difficult to use such polyglycerins alone as polyol components for rigid polyurethane foams, and the polyglycerins should be mixed with other polyols to a polyglycerin concentration of 30 wt % or less (JP-A-2004-359891).

Patent Document 1: JP-A-H02-172938
Patent Document 2: JP-A-H07-216082
Patent Document 3: JP-A-2004-359891

DISCLOSURE OF THE INVENTION

The present invention is aimed at solving the problems in the conventional art described above. It is an object of the invention to provide highly-functionalized, low-viscosity polyether polyols obtained by dehydration condensation of alcohols.

A polyether polyol according to the present invention is obtained by dehydration condensation of glycerin and monohydric and/or dihydric alcohol with the glycerin percentage being more than 50 mol % relative to 100 mol % of the total of the glycerin and alcohol.

Preferably, the polyether polyol has a hydroxyl value of 200 to 1200 mg KOH/g and a viscosity at 25° C. of not more than 50000 mPa·s, and has an average number of hydroxyl groups per molecule of not less than 3.

The glycerin is preferably crude glycerin obtained by hydrolysis or alcoholysis of natural fat and oils.

A first process for producing polyether polyols according to the present invention comprises dehydration condensing glycerin and monohydric and/or dihydric alcohol with the glycerin percentage being more than 50 mol % relative to 100 mol % of the total of the glycerin and alcohol.

A second process for producing polyether polyols according to the present invention comprises dehydration condensing glycerin to produce a condensate, and dehydration condensing the condensate and monohydric and/or dihydric alcohol with the glycerin being used at a percentage of more than 50 mol % relative to 100 mol % of the total of the glycerin and alcohol.

The glycerin is preferably crude glycerin obtained by hydrolysis or alcoholysis of natural fat and oils.

A rigid polyurethane foam according to the present invention is obtained by reacting a polyol component comprising the polyether polyol and a polyisocyanate in the presence of a catalyst, a foaming agent and a foam stabilizer.

A process for producing rigid polyurethane foams according to the present invention comprises reacting a polyol component comprising the polyether polyol and a polyisocyanate in the presence of a catalyst, a foaming agent and a foam stabilizer.

Advantages of the Invention

According to the present invention, polyether polyols having many hydroxyl groups and low viscosity may be easily obtained. The polyether polyols are useful as polyol components for rigid polyurethane foams. The rigid polyurethane foams obtained using the polyether polyols are useful as thermal insulating materials for building panels, refrigerators, freezers and pipes, and as structure support materials for houses and vehicles.

PREFERRED EMBODIMENTS OF THE INVENTION

The polyether polyols according to the present invention can be obtained by dehydration condensation of glycerin and monohydric and/or dihydric alcohol with the glycerin percentage being more than 50 mol % relative to 100 mol % of the total of the glycerin and alcohol. If glycerin alone is condensed to a degree of condensation such that it may be used as a polyol component for rigid polyurethane foams, the viscosity becomes so high that the glycerin cannot be used as a polyol component for rigid polyurethane foams. On the other hand, if the glycerin percentage is 50 mol % or less, a number of hydroxyl groups of the polyether polyols is so decreased and hence the obtainable rigid polyurethane foams have poor strength. The glycerin percentage is preferably in the range of more than 50 mol % to not more than 95 mol %, and more preferably 60 mol % to 90 mol %.

In the present invention, the glycerin is not necessarily refined glycerin, and crude glycerin obtained by hydrolysis or alcoholysis of natural fat and oils such as vegetable oil may be used and the purity thereof may be 95% or below as long as the final products such as rigid polyurethane foams reliably achieve desired properties. According to the carbon neutral concept, the use of plant-derived crude glycerin leads to reduced emission of carbon dioxide which is released by combustion of the polyols and polyurethane foams manufactured using the crude glycerin. Whether polymers are produced from biomass materials may be confirmed by measuring the content of $^{14}C$ and the content of $^{12}C/^{13}C$ and determining the proportion of $^{14}C$ ($^{14}C$ percentage) in accordance with ASTM D 6866.

In detail, $CO_2$ released from a burning sample is accurately quantified and is fed to an AMS (accelerated Mass Spectrometry) apparatus to determine the $^{14}C$ content and the $^{12}C/^{13}C$ content, and the $^{14}C$ percentage is compared to the $^{14}C$ percentages found in air or petrochemicals to distinguish, as described in ASTM (American Society for Testing and Materials) D 6866 04 (Standard Test Method for Determining the Biobased Content of Natural Range Materials Using Radiocarbon and Isotope Ratio Mass Spectrometry Analysis).

Whether the polymers are of biomass origin or not may also be determined by: absorbing $CO_2$ from a burning sample with a $CO_2$ absorbent, or converting $CO_2$ into benzene; then determining the $^{14}C$ content with a liquid scintillation counter; and comparing the $^{14}C$ percentage thus obtained with the percentages found in petroleum products.

$^{14}C$ is not detected in polyols synthesized from petroleum-derived materials alone, and is detected in polyols from plant-origin materials. To achieve reduced carbon dioxide emission, the $^{14}C$ percentage should be not less than 10 pMC (Percent Modern Carbon), preferably not less than 30 pMC, and more preferably 50 pMC.

The monohydric and/or dihydric alcohols are not particularly limited, but those having a boiling point of not less than 160° C. that is the lower limit of reaction temperature are preferred. Examples of the monohydric alcohols include 1-heptanol, 1-octanol, 2-octanol, 1-decanol, 1-dodecanol, 2-dodecanol, 1-tridecanol, 2-tridecanol, 1-tetradecanol, 2-tetradecanol, 7-tetradecanol, 1-hexadecanol, 2-hexadecanol, 1-octadecanol, catechol, nonyl alcohol, isodecyl alcohol, isotridecyl alcohol, cyclohexanol, oleyl alcohol, elaidyl alcohol, phenol, p-ethylphenol, naphthol, xylenol, guaiacol, guethol, p-(α-cumyl)phenol, cresol, p-t-butylphenol, phenylphenol and 4-phenoxyphenol. Examples of the dihydric alcohols include ethylene glycol, diethylene glycol, triethylene glycol, propylene glycol, 1,3-propanediol, dipropylene glycol, tripropylene glycol, 1,2-butanediol, 1,3-butanediol, 1,4-butanediol, 2,3-butanediol, 1,5-pentanediol, neopentyl glycol, 1,6-hexanediol, hexylene glycol, 1,7-heptanediol, 1,8-octanediol, 1,9-nonanediol, 1,10-decanediol, 1,4-cyclohexanediol, isosorbide, bisphenol A, catechol, 4-t-butylcatechol, hydroquinone, 2-t-butylhydroquinone, resorcin, p-hydroxyphenethyl alcohol, 1,4-dihydroxynaphthalene, 1,4-dihydroxyanthraquinone, polyethylene glycol 200 and polyethylene glycol 400. Commercially available monohydric or dihydric polyols for rigid polyurethane foams wherein the above alcohols are used as initiators may be used, with examples including KB-280, KB-300, ES-41, ES-01, Diol-280 and Diol-400 manufactured by MITSUI CHEMICALS POLYURETHANES INC. The alcohols may be used singly, or two or more kinds may be used in combination.

The condensation reaction preferably involves known catalysts used in glycerin condensation such as alkali catalysts, acid catalysts and solid acid catalysts. The catalyst concentration is not particularly limited but is preferably 0.01 to 10 mol % relative to all the hydroxyl groups in the glycerin and alcohol components.

Examples of the alkali catalysts include hydroxides, carbonates and oxides of alkali metals or alkaline earth metals such as sodium, lithium, potassium, calcium, cesium and magnesium, and phosphazene catalysts such as tris[tris(dimethylamino)phosphoranylidene]phosphoric triamide (PZO), tetrakis[tris(dimethylamino)phosphoranylideneamino]phosphonium hydroxide (PZN) and tris[tris(dimethylamino)phosphoranylideneamino]phosphine sulfide (PZS).

Examples of the acid catalysts include iodine, hydrogen iodide, sulfuric acid, phosphoric acid, fluorosulfuric acid, phosphotungstic acid, methanesulfonic acid, trifluoromethanesulfonic acid, octanesulfonic acid, 1,1,2,2-tetrafluoroethanesulfonic acid, benzenesulfonic acid and paratoluenesulfonic acid.

Examples of the solid acid catalysts include the following catalysts (A) to (F):

(A) Catalysts obtained by impregnating layered silicates with acids followed by drying (hereinafter, the catalysts A).

(B) Catalysts obtained by acid adsorption and subsequent calcining of amorphous or crystalline metal oxides containing at least one metal selected from the group consisting of Fe, Ti, Zr, Hf, Mo, W, V, Sn, Si, Al, Zn, Mg and Ca (hereinafter, the catalysts B).

(C) Catalysts obtained by reaction between hydroxides (including partial hydroxides) of the above amorphous or crystalline metal oxides before the calcining, and silane-coupling agents or titanium-coupling agents containing acid radicals (hereinafter, the catalysts C).

(D) Acid cation exchange resins (hereinafter, the catalysts D).

(E) Catalysts from the calcining of inorganic acid salts containing at least one metal selected from the group consisting of Cu, Zn, B, Al, Fe (II), Ni and Mn (hereinafter, the catalysts E).

(F) Insoluble acidic salts of heteropolyacid (hereinafter, the catalysts F).

(Catalysts A)

The silicates are not particularly limited as long as having a layered structure. Examples include smectite group silicates, acid clays, activated earths and vermiculite. The smectite group silicates include montmorillonite, beidellite, nontronite, volkonskoite, saponite, iron saponite, hectorite and sauconite. Further, bentonite whose major component is smectite group silicates may also be used.

When materials for the catalysts A include components other than the layered silicates, for example non-layered silicates or other substances, the content proportion of the layered silicates relative to all the materials is preferably not less than 10 wt %, and more preferably not less than 20 wt %.

The acids may be inorganic acids or organic acids. The inorganic acids include hydrochloric acid, sulfuric acid, nitric acid, phosphoric acid, polyphosphoric acid, phosphorous acid and perchloric acid. The organic acids include formic acid, acetic acid, oxalic acid, monochloroacetic acid, trifluoroacetic acid, trifluoromethanesulfonic acid, paratoluenesulfonic acid, benzenesulfonic acid, methanesulfonic acid, naphthalinesulfonic acid, boric acid, tungstic acid, molybdic acid, vanadic acid, chromic acid and heteropolyacids (e.g., 12-tungstophosphoric acid, 12-tungstosilicic acid, 12-molybdophosphoric acid, 12-molybdosilicic acid, 12-tungstomolybdophosphoric acid, 12-vanadomolybdophosphoric acid, 11-molybdo-1-tungstophosphoric acid, 10-molybdo-2-tungstophosphoric acid, 8-molybdo-4-tungstophosphoric acid, 5-molybdo-7-tungstophosphoric acid, 3-molybdo-9-tungstophosphoric acid, 1-molybdo-11-tungstophosphoric acid, 11-molybdo-1-tungstosilicic acid, 8-molybdo-4-tungstosilicic acid, 6-molybdo-6-tungstosilicic acid, 3-molybdo- 9-tungstosilicic acid, 1-molybdo-11-tungstosilicic acid, 11-tungsto-1-vanadophosphoric acid, 10-tungsto-2-vanadophosphoric acid, 8-tungsto-4-vanadophosphoric acid, 11-molybdo-1-vanadophosphoric acid, 10-molybdo-2-vanadophosphoric acid, 8-molybdo-4-vanadophosphoric acid).

The catalysts A may be produced by for example as follows. The catalyst materials are sprayed with a 10-90 wt % aqueous acid solution while fluidizing the catalyst materials in a fluidized bed apparatus, a drum mixer, a ribbon mixer, a high-speed mixer (Henschel mixer), a twin-cylinder mixer or the like, thereby impregnating the catalyst materials with the acid. The acid-impregnated catalyst materials are optionally washed with water as required to remove free acid radicals. The materials are then dried at 110 to 160° C. under normal pressure or reduced pressure for 3 to 5 hours, and are optionally calcined at 300 to 1000° C. under normal pressure or reduced pressure for 3 to 6 hours.

(Catalysts B)

The amorphous or crystalline metal oxides may be natural or synthetic metal oxides. Examples include zeolites (e.g., A, X, Y, faujasite, M-type, L-type, offretite, erionite, mordenite, ferrierite, clinoptilite, ZSM-5, ZSM-11, silicalite, zeolite β, MCM-22, SSZ-26, MCM-41, MCM-48), substituted zeolites (e.g., ALPO, SAPO-5, MAPO, GAPO) and metallosilicates (e.g., TS-1, TS-2, Ti-MCM-41, Ti-MCM-48, VS-2(I), VS-2 (II), iron-silicate, manganese-silicate, cobalt-silicate, zinc-silicate, boron-silicate).

The acids used herein are as described with respect to the catalysts A hereinabove.

The catalysts B may be produced by for example as follows. The catalyst materials are sprayed with a 10-90 wt % aqueous acid solution while fluidizing the catalyst materials in a fluidized bed apparatus, a drum mixer, a ribbon mixer, a high-speed mixer (Henschel mixer), a twin-cylinder mixer or the like, thereby adsorbing the acid to the catalyst materials. The catalyst materials on which the acid is adsorbed are optionally washed with water as required to remove free acid radicals. The materials are then dried at 110 to 160° C. under normal pressure or reduced pressure for 3 to 5 hours, and are calcined at 300 to 1000° C. under normal pressure or reduced pressure for 3 to 6 hours.

(Catalysts C)

The hydroxides (including partial hydroxides) of amorphous or crystalline metal oxides may be obtained by heating the above-described metal oxides before the calcining, in a water-alcohol mixture solvent at 50 to 110° C. for 1 to 10 hours. The catalysts C are obtained from reaction between the hydroxides and silane-coupling agents or titanium-coupling agents containing acid radicals. Instead of the silane-coupling agents or titanium-coupling agents containing acid radicals, coupling agents that contain acid radical precursor groups may be used. In this case, the hydroxides and the coupling agents that contain the acid radical precursor groups are reacted and thereafter the precursor groups are converted into acid radicals. Examples of the conversion reactions include conversion of the —Cl or —Br groups to the —SO$_3$H groups by the Strecker reaction, and conversion of the —SH groups to the —SO$_3$H groups with oxidants such as peroxides, chromium dioxide, permanganates and halogens.

(Catalysts D)

Examples of the acid cation exchange resins include strongly acidic cation exchange resins. The strongly acidic cation exchange resins may be in the gel or porous form. Specific examples include styrene/divinyl benzene three-dimensional copolymers, sulfonated product of phenol/formalin condensate, and tetrafluoroethylene/perfluoro[2-(fluorosulfonylethoxy) propylvinyl ether] copolymer.

Commercially available strongly acidic cation exchange resins include DIAION series SK1B, SK102, SK116, PK206, PK208, HPK25 and HPK55 (manufactured by Mitsubishi Chemical Corporation); AMBERLITE series IR120B, IR122, IR124, 200C, 252 and 200CT; DUOLITE series C20, C26, C25D and ES26 (manufactured by Rohm and Haas Company); DOWEX series HCR-S, HGR-W2, 50W-X8 and MSC-1 (manufactured by The Dow Chemical Company); IONAC C-240 (manufactured by SYBRON CHEMICALS INC.); Lewatit series S-100, S-109, SP-112 and SP-120; Bayer Catalyst series K1131, K1411, K1431, K1481, K2411, K-2431, K2441, K2461, K2611, K2631, K2641 and K2661 (manufactured by Bayer AG); NAFION series 117, 417 and Nafion NR-50 (manufactured by DuPont Kabushiki Kaisha); and DELOXAN series ASP1/9, ASP1/7, ASPIV/6-2 and ASPII/3.6% Al (manufactured by Degussa).

(Catalysts E)

The catalysts E may be prepared by sintering metal inorganic acid salts under atmospheric or reduced pressure at 300 to 1000° C. for 3 to 6 hours. The inorganic acids include hydrochloric acid, sulfuric acid, nitric acid, phosphoric acid, polyphosphoric acid, phosphorous acid and perchloric acid.

(Catalysts F)

Examples of the insoluble acidic salts of heteropolyacid include $Cs_{2.5}H_{0.5}PW_{12}O_{40}$.

[Condensation Reaction]

The condensation reaction of the glycerin and monohydric and/or dihydric alcohol may be carried out using any reaction apparatus equipped with devices for distilling away the by-product water. An exemplary reaction apparatus is connected with a distillation column at the top of the reaction apparatus and is connected with a condenser.

In the distillation column, the glycerin and monohydric and/or dihydric alcohol that are the starting materials, and by-produced water, low polymers and the like are distilled such that the necessary components such as the starting materials and low polymers are refluxed into the reaction apparatus and unnecessary components such as water are discharged into the condenser. The number of theoretical plates of the distillation columns is not particularly limited, but it is generally 1 to 20. The packing materials in the distillation columns are not particularly limited, but raschig rings, berl saddles, McMahon packing, Canon packing, Stedman packing, Sulzer packing and Dixon packing may be generally used. The temperature of the distillation columns is not particularly limited and may be appropriately controlled using a cooling medium or a heating medium.

The condenser is used to condense water or by-produced low-boiling fractions. The condensation is generally performed with use of a cooling medium. The temperature of the cooling media is not particularly limited, but is generally in the range of about −30 to 60° C.

The reaction temperature in the dehydration condensation is not particularly limited as long as the dehydration condensation is induced at the temperature. The reaction temperature is preferably 160 to 280° C., and more preferably 200 to 260° C. The reaction pressure is not particularly limited, and the reaction may be carried out under any condition of normal pressure, reduced pressure or increased pressure as long as a large part of the glycerin and monohydric and/or dihydric alcohol will not be distilled away together with water.

The glycerin and the monohydric and/or dihydric alcohol may be mixed together at any time as long as the percentage of the glycerin units in the reaction system is maintained above 50 mol %. For example, the glycerin and the monohydric and/or dihydric alcohol may be all at once added to the reaction apparatus and the condensation reaction may be initiated. Alternatively, the glycerin alone may be placed into the reaction apparatus and condensed partially or completely, and the condensate may be further condensed with the monohydric and/or dihydric alcohol.

[Polyether Polyols]

By the processes as described hereinabove, there may be obtained polyether polyols that preferably have a hydroxyl value of 200 to 1200 mg KOH/g, more preferably 300 to 800 mg KOH/g, and a viscosity at 25° C. of not more than 50000 mPa·s. The polyether polyols are suitably used as polyol components for rigid polyurethane foams. If the hydroxyl value is below the lower limit, the glass transition temperature of rigid polyurethane foams is lowered and thus sufficient rigidity cannot be achieved in the rigid polyurethane foams. On the other hand, if the hydroxyl value exceeds the upper limit, the hydroxyl group concentration in the polyol component is excessively high and scorching may be caused by rapid heat generation in the production of rigid polyurethane foams. The viscosity in the above range permits foaming at from room temperature to 50° C. in the production of rigid polyurethane foams.

The polyether polyols preferably have an average number of hydroxyl groups per molecule of not less than 3, whereby the degree of crosslinking in the rigid polyurethane foams is increased and the resin strength is enhanced.

[Monomer Removal from Polyether Polyols]

The polyether polyols obtained in the present invention may contain unreacted monohydric and/or dihydric alcohols. Such unreacted monomers may be removed by known methods, for example by stripping under reduced pressure, prior to the production of rigid polyurethane foams.

[Purification of Polyether Polyols]

The polyols may be purified to remove the catalysts, or may be used without purification in the production of rigid polyurethane foams. The purification methods may be conventional depending on the types of the catalysts used.

When basic catalysts such as potassium hydroxide, sodium hydroxide, potassium carbonate and phosphazene catalyst are used, they may be removed by neutralization with acids such as hydrochloric acid, acetic acid and oxalic acid followed by filtration, or may be removed by eliminating cations with cation exchange resins. When acid catalysts such as sulfuric acid, paratoluenesulfonic acid, hydrochloric acid and phosphoric acid are used, they may be removed by neutralization with bases such as sodium hydroxide, potassium hydroxide and potassium carbonate followed by filtration, or may be removed by eliminating anions with anion exchange resins. When the polyols are colored, the coloring components may be removed by adsorbing them to activated carbon and the like.

[Rigid Polyurethane Foams]

The rigid polyurethane foams according to the present invention may be obtained by reacting and thereby foaming a polyol component including the polyether polyol and a polyisocyanate in the presence of a catalyst, a foaming agent and a foam stabilizer by known methods. The rigid polyurethane foams produced using the polyether polyols are excellent in compressive strength, dimensional stability and thermal conductivity. Therefore, the rigid polyurethane foams of the present invention are useful as thermal insulating materials for building panels, refrigerators, freezers, pipes and the like, and as structure support materials for houses and vehicles such as automobiles.

The polyol component may be the polyether polyol itself or a mixture of the polyether polyol with other polyol. Such other polyols are not particularly limited as long as having a hydroxyl group at an end. Mention may be made of known polyether polyols and polyester polyols.

Examples of the polyether polyols used as the other polyols include polyether polyols obtained by addition polymerization of polyhydric alcohols, aromatic amines and aliphatic amines with alkylene oxides.

The polyhydric alcohols are not particularly limited, and any polyhydric alcohols which can be employed in the polyether polyol production may be used. Specific examples include ethylene glycol, diethylene glycol, triethylene glycol, propylene glycol, dipropylene glycol, tripropylene glycol, trimethylolpropane, trimethylolethane, glycerin, pentaerythritol, α-methyl glucoside, maltose, sorbitol and sucrose. They may be used singly, or two or more kinds may be used in combination.

Examples of the aromatic amines include tolylenediamine (hereinafter, TDA) and/or crude TDA, and diphenylmethanediamine (hereinafter, MDA) and/or crude MDA.

Examples of the aliphatic amines include ethylenediamine, triethanolamine and isopropanolamine. They may be used singly, or two or more kinds may be used in combination.

Any alkylene oxides used in the polyether polyol production may be employed, and examples thereof include C2-8 alkylene oxides. Specific examples include ethylene oxide, propylene oxide and butylene oxide, with propylene oxide and butylene oxide being preferable. They may be used singly, or two or more kinds may be used in combination.

Examples of the polyester polyols used herein include polymers that are obtained by semi-esterifying anhydrides of aromatic carboxylic acids, aliphatic carboxylic acids or the like with polyhydric alcohols or aliphatic amines and then polymerizing the semi-esters with alkylene oxides. Examples further include polymers that are obtained by condensing aromatic carboxylic acids or aliphatic carboxylic acids with polyhydric alcohols.

Examples of the aromatic carboxylic acids include phthalic acid, terephthalic acid, isophthalic acid and pyromellitic acid. Examples of the anhydrides of aromatic carboxylic acids include phthalic anhydride and pyromellitic anhydride.

Examples of the aliphatic carboxylic acids include adipic acid, succinic acid and maleic acid. Examples of the anhydrides of aliphatic carboxylic acids include succinic anhydride and maleic anhydride.

The polyisocyanates are not particularly limited as long as being bifunctional or higher functional polyisocyanates. Examples thereof include diphenylmethane diisocyanate (hereinafter, MDI), polymeric MDI, tolylene diisocyanate (hereinafter, TDI), hexamethylene diisocyanate (hereinafter, HDI), xylene diisocyanate (hereinafter, XDI), norbornene diisocyanate (hereinafter, NBDI), dicyclohexylmethane diisocyanate (hereinafter, $H_{12}$MDI), hydrogenated xylylene diisocyanate (hereinafter, $H_6$XDI) and isophorone diisocyanate (hereinafter, IPDI). The polyisocyanates may be used singly, or two or more kinds may be use a in combination. Of the polyisocyanates, TDI and/or MDI may be preferably used in the production of rigid polyurethane foams.

A single or a mixture of TDI isomers may be used. In detail, 2,4-isomer (100% 2,4-TDI), 2,4-isomer/2,6-isomer=80/20 or 65/35 (mass ratio) mixture, mixtures of these isomers, and crude TDI containing polyfunctional tar (e.g., TDI-TRC manufactured by MITSUI CHEMICALS POLYURETHANES INC.) may be used.

Suitable examples of MDI include diisocyanates based on 4,4'-isomer (4,4'-MDI), and polymeric MDI containing polycore molecules with three or more cores (e.g., COSMONATE series manufactured by MITSUI CHEMICALS POLYURETHANES INC.).

Examples of the polyisocyanates further include modified products such as polyisocyanurates, carbodiimide-modified polyisocyanates, prepolymerized polyisocyanates (prepolymers obtained from polyisocyanates and the foregoing polyols and having an isocyanate group at a molecular end) and urethodione-modified polyisocyanates. The polyisocyanates and modified products thereof may be used singly, or two or more kinds may be used in combination.

The polyols and the polyisocyanates may be used in any ratio without limitation in the present invention. They are generally used in a molar ratio between the isocyanate groups in the polyisocyanates and the active hydrogen groups in the polyols of 50:100 to 300:100, and preferably 90:100 to 150:100.

The catalysts, foaming agents and foam stabilizers used in the invention may be conventional in the production of rigid polyurethane foams. Other additives such as flame retardants, antioxidants, coloring agents, plasticizers and stabilizers may be used as required while still achieving the object of the present invention.

EXAMPLES

The present invention will be described based on Examples hereinbelow without limiting the scope of the invention. Hereinbelow, parts refer to parts by weight unless otherwise specified. Analysis and measurement methods in Examples and Comparative Examples are as follows.

<Properties of Polyether Polyols>

Hydroxyl value: The hydroxyl value was defined as the weight in mg of potassium hydroxide corresponding to the hydroxyl groups in 1 g of the polyether polyol. The measurement was carried out in accordance with JIS K 1557, Item 6.4, "Hydroxyl value".

Viscosity: The viscosity was measured at 25° C. using a cone-and-plate rotational viscometer (E-type viscometer).

Glycerin monomer content (glycerin purity): Approximately 0.03 g of the polyether polyol obtained was precisely weighed out, and 0.5 g of N,O-trimethylsilylacetamide was added thereto. The volume was then increased to 10 ml by addition of dimethylformamide. The liquid was allowed to stand at room temperature for at least 6 hours and was analyzed with gas chromatograph GC-14A (manufactured by Shimadzu Corporation) under the following conditions. The calibration curve was prepared based on glycerin reagent (manufactured by Wako Pure Chemical Industries Ltd.).

Carrier gas: helium gas at 50 ml/min
Hydrogen pressure: 0.5 MPa
Air pressure: 0.5 MPa
Column: packed column (packing material: SE-30, column length: 2 m)
Injection temperature: 300° C.
Column temperature: held at 80° C. for 5 min, raised to 300° C. at 20° C./min, and held at 300° C. for 5 min.

Molecular weight: Approximately 0.05 g of the polyether polyol obtained was precisely weighed out, and 0.5 g of N,O-bis(trimethylsilyl)acetamide was added thereto. The volume was then increased to 10 ml by addition of a liquid mixture consisting of dimethylformamide (hereinafter, DMF)/tetrahydrofuran (hereinafter, THF) (DMF:THF=1:9 (by weight)). The liquid was analyzed with gel permeation chromatograph (GPC) HLC-8020 (manufactured by TOSOH CORPORATION) under the following conditions.

Eluting solution: THF
Eluting solution flow rate: 0.8 ml/min
Eluting solution temperature: 40° C.
Column temperature: 40° C.
Columns: TSK gel G-3000H, G-2000H and G-1000H connected in series (manufactured by TOSOH CORPORATION)
Detector: RI
Standards: polystyrene standards Average number of hydroxyl groups: The average number of hydroxyl groups was calculated from the following equation based on the GPC molecular weight and the hydroxyl value obtained by hydroxyl value measurement.

Average number of hydroxyl groups=(molecular weight×hydroxyl value)/(56108+74×hydroxyl value)

<Properties of Rigid Polyurethane Foams>

Core density: The core density was measured in accordance with JIS K 6400. The core density is an apparent density according to JIS. In the present invention, a cubic sample of rectangular parallelepiped sampled from the foam sample was used in the measurement.

Compressive strength: In accordance with JIS K 7220, "Rigid cellular plastics—Determination of compression properties", the foam obtained was cut to 80×80×40 mm and the compressive strength in the direction parallel with the foaming direction was measured.

Example 1

(Preparation of Polyether Polyol)

A flask equipped with a distillation column and a condenser was charged with 1288 g of glycerin (70 mol % relative to all the alcohols) and 32.2 g of potassium carbonate. The glycerin was dehydrated and condensed in a nitrogen atmosphere at a temperature of 260° C. and a pressure of 70 to 75 kPa for 6 hours. Subsequently, the flask temperature was lowered to 200° C., and 805.2 g of dipropylene glycol (hereinafter, DPG) (30 mol % relative to all the alcohols) was added. The dehydration condensation was further carried out at 200° C. and 60 kPa. Because the amount of distillates became small after 12 hours, the temperature was increased and the pressure was reduced. The dehydration condensation was then further carried out at 220° C. and 45 kPa, and a polyether polyol (1) was obtained. The total reaction time from the charging of glycerin was 57 hours.

The hydroxyl value, number average molecular weight, average number of hydroxyl groups and 25° C. viscosity of the polyether polyol (1) are set forth in Table 1. The residual glycerin was quantified to be not more than 1 wt % (0.3 wt %) according to gas chromatography.

(Manufacturing of Rigid Polyurethane Foam)

100 Parts of the polyether polyol (1) was mixed with 1 part of dimethylcyclohexylamine as a catalyst, 4 parts of water as a foaming agent and 2 parts of silicone foam stabilizer SZ-1711 (manufactured by Dow Corning Toray Co., Ltd.) as a foam stabilizer to give a resin premix. The resin premix was combined with 231.69 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a rigid polyurethane foam.

Example 2

A polyether polyol (2) was prepared in the same manner as in Example 1 except that the reaction time was changed. The hydroxyl value, number average molecular weight, average number of hydroxyl groups and 25° C. viscosity of the polyether polyol (2) are set forth in Table 1. The residual glycerin was quantified to be not more than 1 wt % (0.4 wt %) according to gas chromatography.

Example 3

A polyether polyol (3) was prepared in the same manner as in Example 1 except that the reaction time was changed. The hydroxyl value, number average molecular weight, average number of hydroxyl groups and 25° C. viscosity of the polyether polyol (3) are set forth in Table 1. The residual glycerin was quantified to be not more than 1 wt % (0.4 wt %) according to gas chromatography.

Example 4

(Preparation of Polyether Polyol)

A flask equipped with a distillation column and a condenser was charged with 184 g of glycerin (70 mol % relative to all the alcohols), 152.5 g of triethylene glycol (hereinafter, TEG) (30 mol % relative to all the alcohols) and 2.65 g of potassium carbonate. They were dehydrated and condensed at a temperature of 260° C. and a pressure of 30 kPa for 24 hours to afford a polyether polyol (4).

The hydroxyl value, number average molecular weight, average number of hydroxyl groups and 25° C. viscosity of the polyether polyol (4) are set forth in Table 1. The residual glycerin was quantified to be not more than 1 wt % (0.4 wt %) according to gas chromatography.

(Manufacturing of Rigid Polyurethane Foam)

A resin premix was prepared in the same manner as in Example 1 except that the polyether polyol (1) was replaced by 100 parts of the polyether polyol (4). The resin premix was temperature-controlled at 50° C. It was then combined with 273.85 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a rigid polyurethane foam.

Example 5

A polyether polyol (5) was prepared in the same manner as in Example 4 except that the reaction time was changed. The hydroxyl value, number average molecular weight, average number of hydroxyl groups and 25° C. viscosity of the polyether polyol (5) are set forth in Table 1. The residual glycerin was quantified to be not more than 1 wt % (0.5 wt %) according to gas chromatography.

Example 6

(Preparation of Polyether Polyol)

A flask equipped with a distillation column and a condenser was charged with 180 g of glycerin (90 mol % relative to all the alcohols), 39 g of TEG (10 mol % relative to all the alcohols) and 2 g of potassium carbonate. They were dehydrated and condensed at a temperature of 260° C. and a pressure of 30 kPa for 3 hours to afford a polyether polyol (6).

The hydroxyl value, number average molecular weight, average number of hydroxyl groups and 25° C. viscosity of the polyether polyol (6) are set forth in Table 1. The residual glycerin was quantified to be not more than 1 wt % (0.3 wt %) according to gas chromatography.

(Manufacturing of Rigid Polyurethane Foam)

A resin premix was prepared in the same manner as in Example 1 except that the polyether polyol (1) was replaced by 100 parts of the polyether polyol (6). The resin premix was combined with 174.22 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a rigid polyurethane foam.

Example 7

A polyether polyol (7) was prepared in the same manner as in Example 6 except that the reaction time was changed. The hydroxyl value, number average molecular weight, average number of hydroxyl groups and 25° C. viscosity of the polyether polyol (7) are set forth in Table 1. The residual glycerin was quantified to be not more than 1 wt % (0.5 wt %) according to gas chromatography.

Example 8

(Preparation of Polyether Polyol)

A flask equipped with a distillation column and a condenser was charged with 500 g of glycerin (59 mol % relative to all the alcohols), 400 g of diethylene glycol (hereinafter, DEG) (41 mol % relative to all the alcohols) and 23 g of potassium carbonate. They were dehydrated and condensed at a temperature of 240° C. and a pressure of 101 kPa for 34 hours to afford a polyether polyol (8).

The hydroxyl value, number average molecular weight, average number of hydroxyl groups and 25° C. viscosity of the polyether polyol (8) are set forth in Table 1. The residual glycerin was quantified to be not more than 1 wt % (0.2 wt %) according to gas chromatography.

(Manufacturing of Rigid Polyurethane Foam)

A resin premix was prepared in the same manner as in Example 1 except that the polyether polyol (1) was replaced by 100 parts of the polyether polyol (8). The resin premix was combined with 204.84 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a rigid polyurethane foam.

Example 9

A polyether polyol (9) was prepared in the same manner as in Example 8 except that the reaction time was changed. The hydroxyl value, number average molecular weight, average number of hydroxyl groups and 25° C. viscosity of the polyether polyol (9) are set forth in Table 1. The residual glycerin was quantified to be not more than 1 wt % (0.2 wt %) according to gas chromatography.

Example 10

(Preparation of Polyether Polyol)

A flask equipped with a distillation column and a condenser was charged with 460 g of glycerin (50.1 mol % relative to all the alcohols), 528 g of DEG (49.9 mol % relative to all the alcohols) and 25.4 g of potassium carbonate. They were dehydrated and condensed at a temperature of 240° C. and a pressure of 101 kPa for 55 hours to afford a polyether polyol (10).

The hydroxyl value, number average molecular weight, average number of hydroxyl groups and 25° C. viscosity of the polyether polyol (10) are set forth in Table 1. The residual glycerin was quantified to be not more than 1 wt % (0.2 wt %) according to gas chromatography.

(Manufacturing of Rigid Polyurethane Foam)

A resin premix was prepared in the same manner as in Example 1 except that the polyether polyol (1) was replaced by 100 parts of the polyether polyol (10). The resin premix was combined with 177.9 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a rigid polyurethane foam.

Example 11

(Preparation of Polyether Polyol)

A flask equipped with a distillation column and a condenser was charged with 1515 g of crude glycerin (manufactured by ACCIONA S.A. (Spain), purity: 85% (by gas chromatography)) (70 mol % relative to all the alcohols) and 53.7 g of potassium carbonate. The inner temperature was increased to 140° C. and water in the crude glycerin was removed in 3 hours in a nitrogen atmosphere. The crude glycerin was then dehydrated and condensed at a temperature of 260° C. and a pressure of 70 to 75 kPa for 6 hours. Subsequently, the flask temperature was lowered to 200° C., and 805.2 g of DPG (30 mol % relative to all the alcohols) was added. The dehydration condensation was further carried out at 200° C. and 60 kPa. Because the amount of distillates became small after 12 hours, the temperature was increased and the pressure was reduced. The dehydration condensation was then further carried out at 220° C. and 45 kPa, and a polyether polyol (11) was obtained. The total reaction time from the charging of glycerin was 70 hours.

The hydroxyl value, number average molecular weight, average number of hydroxyl groups and 25° C. viscosity of the polyether polyol (11) are set forth in Table 1. The residual glycerin was quantified to be not more than 1 wt % (0.4 wt %) according to gas chromatography.

(Manufacturing of Rigid Polyurethane Foam)

A resin premix was prepared in the same manner as in Example 1 except that the polyether polyol (1) was replaced by 100 parts of the polyether polyol (11). The resin premix was combined with 228.68 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a rigid polyurethane foam.

Example 12

(Preparation of Polyether Polyol)

A flask equipped with a distillation column and a condenser was charged with 640 g of glycerin (95 mol % relative to all the alcohols), 160 g of polyethylene glycol 400 (hereinafter, PEG 400) (5 mol % relative to all the alcohols) and 20.5 g of potassium carbonate. They were dehydrated and condensed at a temperature of 260° C. and a pressure of 101 kPa for 3 hours to afford a polyether polyol (12).

The hydroxyl value, number average molecular weight, average number of hydroxyl groups and 25° C. viscosity of the polyether polyol (12) are set forth in Table 1. The residual glycerin was quantified to be not more than 1 wt % (0.3 wt %) according to gas chromatography.

(Manufacturing of Rigid Polyurethane Foam)

A resin premix was prepared in the same manner as in Example 1 except that the polyether polyol (1) was replaced by 100 parts of the polyether polyol (12). The resin premix was combined with 268.75 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a rigid polyurethane foam.

Example 13

(Preparation of Polyether Polyol)

A flask equipped with a distillation column and a condenser was charged with 332 g of glycerin (70 mol % relative to all the alcohols), 528 g of isosorbide (30 mol % relative to all the alcohols) and 13.8 g of potassium carbonate. They were dehydrated and condensed at a temperature of 240° C. and a pressure of 101 kPa for 6 hours to afford a polyether polyol (13).

The hydroxyl value, number average molecular weight, average number of hydroxyl groups and 25° C. viscosity of the polyether polyol (13) are set forth in Table 1. The residual glycerin was quantified to be not more than 1 wt % (0.4 wt %) according to gas chromatography.

(Manufacturing of Rigid Polyurethane Foam)

A resin premix was prepared in the same manner as in Example 1 except that the polyether polyol (1) was replaced by 100 parts of the polyether polyol (13). The resin premix was combined with 177.9 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a rigid polyurethane foam.

Example 14

(Preparation of Polyether Polyol)

A flask equipped with a distillation column and a condenser was charged with 650 g of glycerin (70 mol % relative to all the alcohols), 325 g of DEG (30 mol % relative to all the alcohols) and 7.46 g of sodium hydroxide. They were dehydrated and condensed at a temperature of 240° C. and a pressure of 101 kPa for 44 hours to afford a polyether polyol (14).

The hydroxyl value, number average molecular weight, average number of hydroxyl groups and 25° C. viscosity of the polyether polyol (14) are set forth in Table 1. The residual glycerin was quantified to be not more than 1 wt % (0.4 wt %) according to gas chromatography.

(Manufacturing of Rigid Polyurethane Foam)

A resin premix was prepared in the same manner as in Example 1 except that the polyether polyol (1) was replaced by 100 parts of the polyether polyol (14). The resin premix was combined with 232.0 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a rigid polyurethane foam.

Example 15

(Preparation of Polyether Polyol)

A flask equipped with a distillation column and a condenser was charged with 650 g of glycerin (70 mol % relative to all the alcohols), 325 g of DEG (30 mol % relative to all the alcohols) and 7.65 g of lithium hydroxide monohydrate. They were dehydrated and condensed at a temperature of 240° C. and a pressure of 101 kPa for 48 hours to afford a polyether polyol (15).

The hydroxyl value, number average molecular weight, average number of hydroxyl groups and 25° C. viscosity of the polyether polyol (15) are set forth in Table 1. The residual glycerin was quantified to be not more than 1 wt % (0.3 wt %) according to gas chromatography.
(Manufacturing of Rigid Polyurethane Foam)

A resin premix was prepared in the same manner as in Example 1 except that the polyether polyol (1) was replaced by 100 parts of the polyether polyol (15). The resin premix was combined with 239.0 parts of polymeric MDI (M-200 manufactured by MITSUI CHEMICALS POLYURE-THANES INC.) and mixed therewith in a dynamic mixer. The mixture liquid was then poured into a 200 mm×200 mm×200 mm free foaming box and afforded a rigid polyurethane foam.

Example 16

(Preparation of Polyether Polyol)

A flask equipped with a distillation column and a condenser was charged with 650 g of glycerin (70 mol % relative to all the alcohols), 325 g of DEG (30 mol % relative to all the alcohols) and 6.28 g of p-toluenesulfonic acid. They were dehydrated and condensed at a temperature of 160° C. and a pressure of 101 kPa for 22 hours to afford a polyether polyol (16).

The hydroxyl value, number average molecular weight, average number of hydroxyl groups and 25° C. viscosity of the polyether polyol (16) are set forth in Table 1. The residual glycerin was quantified to be not more than 1 wt % (0.4 wt %) according to gas chromatography.
(Manufacturing of Rigid Polyurethane Foam)

A resin premix was prepared in the same manner as in Example 1 except that the polyether polyol (1) was replaced by 100 parts of the polyether polyol (16). The resin premix was combined with 263.6 parts of polymeric MDI (M-200 manufactured by MITSUI CHEMICALS POLYURE-THANES INC.) and mixed therewith in a dynamic mixer. The mixture liquid was then poured into a 200 mm×200 mm×200 mm free foaming box and afforded a rigid polyurethane foam.

Example 17

(Preparation of Polyether Polyol)

A flask equipped with a distillation column and a condenser was charged with 650 g of glycerin (70 mol % relative to all the alcohols), 325 g of DEG (30 mol % relative to all the alcohols) and 10.23 g of potassium hydroxide. They were dehydrated and condensed at a temperature of 240° C. and a pressure of 101 kPa for 56 hours to afford a polyether polyol (17).

The hydroxyl value, number average molecular weight, average number of hydroxyl groups and 25° C. viscosity of the polyether polyol (17) are set forth in Table 1. The residual glycerin was quantified to be not more than 1 wt % (0.3 wt %) according to gas chromatography.
(Manufacturing of Rigid Polyurethane Foam)

A resin premix was prepared in the same manner as in Example 1 except that the polyether polyol (1) was replaced by 100 parts of the polyether polyol (17). The resin premix was combined with 222.9 parts of polymeric MDI (M-200 manufactured by MITSUI CHEMICALS POLYURE-THANES INC.) and mixed therewith in a dynamic mixer. The mixture liquid was then poured into a 200 mm×200 mm×200 mm free foaming box and afforded a rigid polyurethane foam.

Example 18

(Preparation of Polyether Polyol)

A flask equipped with a distillation column and a condenser was charged with 570 g of glycerin (70 mol % relative to all the alcohols), 285 g of DEG (30 mol % relative to all the alcohols) and 24 g of cesium hydroxide. They were dehydrated and condensed at a temperature of 240° C. and a pressure of 101 kPa for 32 hours to afford a polyether polyol (18).

The hydroxyl value, number average molecular weight, average number of hydroxyl groups and 25° C. viscosity of the polyether polyol (18) are set forth in Table 1. The residual glycerin was quantified to be not more than 1 wt % (0.3 wt %) according to gas chromatography.
(Manufacturing of Rigid Polyurethane Foam)

A resin premix was prepared in the same manner as in Example 1 except that the polyether polyol (1) was replaced by 100 parts of the polyether polyol (18). The resin premix was combined with 211.6 parts of polymeric MDI (M-200 manufactured by MITSUI CHEMICALS POLYURE-THANES INC.) and mixed therewith in a dynamic mixer. The mixture liquid was then poured into a 200 mm×200 mm×200 mm free foaming box and afforded a rigid polyurethane foam.

Example 19

(Preparation of Polyether Polyol)

A flask equipped with a distillation column and a condenser was charged with 650 g of glycerin (70 mol % relative to all the alcohols), 325 g of DEG (30 mol % relative to all the alcohols) and 22.47 g of PZN. They were dehydrated and condensed at a temperature of 240° C. and a pressure of 101 kPa for 57 hours to afford a polyether polyol (19).

The hydroxyl value, number average molecular weight, average number of hydroxyl groups and 25° C. viscosity of the polyether polyol (19) are set forth in Table 1. The residual glycerin was quantified to be not more than 1 wt % (0.5 wt %) according to gas chromatography.
(Manufacturing of Rigid Polyurethane Foam)

A resin premix was prepared in the same manner as in Example 1 except that the polyether polyol (1) was replaced by 100 parts of the polyether polyol (19). The resin premix was combined with 228.7 parts of polymeric MDI (M-200 manufactured by MITSUI CHEMICALS POLYURE-THANES INC.) and mixed therewith in a dynamic mixer. The mixture liquid was then poured into a 200 mm×200 mm×200 mm free foaming box and afforded a rigid polyurethane foam.

Example 20

(Preparation of Polyether Polyol)

A flask equipped with a distillation column and a condenser was charged with 1565 g of glycerin (80 mol % relative to all the alcohols), 450 g of DEG (20 mol % relative to all the alcohols) and 21.46 g of potassium hydroxide. They were dehydrated and condensed at a temperature of 250° C. and a pressure of 101 kPa for 27 hours to afford a polyether polyol (20).

The hydroxyl value, number average molecular weight, average number of hydroxyl groups and 25° C. viscosity of the polyether polyol (20) are set forth in Table 1. The residual glycerin was quantified to be not more than 1 wt % (0.6 wt %) according to gas chromatography.
(Manufacturing of Rigid Polyurethane Foam)

A resin premix was prepared in the same manner as in Example 1 except that the polyether polyol (1) was replaced by 100 parts of the polyether polyol (20). The resin premix was temperature-controlled at 25° C. It was then combined with 187.0 parts of polymeric MDI (M-200 manufactured by MITSUI CHEMICALS POLYURETHANES INC.) that was temperature-controlled at 25° C., and was mixed therewith in a dynamic mixer. The mixture liquid was then poured into a 200 mm×200 mm×200 mm free foaming box and afforded a rigid polyurethane foam.

Example 21

(Preparation of Polyether Polyol)

A flask equipped with a distillation column and a condenser was charged with 1100 g of glycerin (60 mol % relative to all the alcohols), 845 g of DEG (40 mol % relative to all the alcohols) and 20.12 g of potassium hydroxide. They were dehydrated and condensed at a temperature of 250° C. and a pressure of 101 kPa for 27 hours to afford a polyether polyol (21).

The hydroxyl value, number average molecular weight, average number of hydroxyl groups and 25° C. viscosity of the polyether polyol (21) are set forth in Table 1. The residual glycerin was quantified to be not more than 1 wt % (0.9 wt %) according to gas chromatography.

(Neutralization of Polyether Polyol)

The polyether polyol (21) was neutralized by adding a 10% aqueous oxalic acid solution to a pH of 5 and holding the polyol at 90° C. for 1 hour. After the neutralization, the temperature was increased to 110° C., and the pressure was reduced to 0.1 kPa in 2 hours. These conditions were maintained constant for 2 hours and thereby water was removed. Subsequent pressure filtration resulted in a neutralized product (21-A) of the polyether polyol (21).

(Manufacturing of Rigid Polyurethane Foam)

100 Parts of the polyether polyol (21-A) was mixed with 1.5 parts of N,N,N',N'-tetramethylhexanediamine, 3.47 parts of water as a foaming agent and 2 parts of foam stabilizer X20-1328 (manufactured by Shin-Etsu Chemical Co., Ltd.) to give a resin premix. The resin premix was temperature-controlled at 25° C. It was then combined with 240.8 parts of polymeric MDI (M-200 manufactured by MITSUI CHEMICALS POLYURETHANES INC.) that was temperature-controlled at 25° C., and was mixed therewith in a dynamic mixer. The mixture liquid was then poured into a 200 mm×200 mm×200 mm free foaming box and afforded a rigid polyurethane foam. The core density and compressive strength of the rigid polyurethane foam were measured to be 39.2 kg/m$^3$ and 132.1 kPa, respectively.

Example 22

(Preparation of Polyether Polyol)

A flask equipped with a distillation column and a condenser was charged with 1300 g of glycerin (70 mol % relative to all the alcohols), 650 g of DEG (30 mol % relative to all the alcohols) and 20.46 g of potassium hydroxide. They were dehydrated and condensed at a temperature of 250° C. and a pressure of 101 kPa for 22 hours to afford a polyether polyol (22).

The hydroxyl value, number average molecular weight, average number of hydroxyl groups and 25° C. viscosity of the polyether polyol (22) are set forth in Table 1. The residual glycerin was quantified to be not more than 1 wt % (0.9 wt %) according to gas chromatography.

(Neutralization of Polyether Polyol)

The polyether polyol (22) was neutralized by adding a 10% aqueous oxalic acid solution to a pH of 5 and holding the polyol at 90° C. for 1 hour. After the neutralization, the temperature was increased to 110° C., and the pressure was reduced to 0.1 kPa in 2 hours. These conditions were maintained constant for 2 hours and thereby water was removed. Subsequent pressure filtration resulted in a neutralized product (22-A) of the polyether polyol (22).

(Manufacturing of Rigid Polyurethane Foam)

100 Parts of the polyether polyol (22-A) was mixed with 1.5 parts of N,N,N',N'-tetramethylhexanediamine, 3.64 parts of water as a foaming agent and 2 parts of foam stabilizer X20-1328 (manufactured by Shin-Etsu Chemical Co., Ltd.) to give a resin premix. The resin premix was temperature-controlled at 25° C. It was then combined with 257.5 parts of polymeric MDI (M-200 manufactured by MITSUI CHEMICALS POLYURETHANES INC.) that was temperature-controlled at 25° C., and was mixed therewith in a dynamic mixer. The mixture liquid was then poured into a 200 mm×200 mm×200 mm free foaming box and afforded a rigid polyurethane foam. The core density and compressive strength of the rigid polyurethane foam were measured to be 48.4 kg/m$^3$ and 176.7 kPa, respectively.

Comparative Example 1

(Preparation of Polyether Polyol)

A flask equipped with a distillation column and a condenser was charged with 600 g of glycerin and 6 g of potassium carbonate. The glycerin was dehydrated and condensed at a temperature of 260° C. and a pressure of 50 kPa for 5 hours to afford a polyether polyol (C1).

The polyether polyol (C1) had a hydroxyl value of 868 mg KOH/g, a number average molecular weight of 873 and an average number of hydroxyl groups of 6.3. The measurement of viscosity at 25° C. could not be carried out because the viscosity exceeded 200000 mPa·s.

(Manufacturing of Rigid Polyurethane Foam)

A resin premix was prepared in the same manner as in Example 1 except that the polyether polyol (1) was replaced by 100 parts of the polyether polyol (C1). The resin premix had so high a viscosity that it could not be stirred sufficiently, and consequently polyurethane foams were not manufactured.

Comparative Example 2

(Preparation of Polyether Polyol)

A flask equipped with a distillation column and a condenser was charged with 350 g of dipropylene glycol and 8.99 g of potassium carbonate. The glycol was dehydrated and condensed at a temperature of 235° C. and a pressure of 101 kPa for 37 hours to afford a polyether polyol (C2).

The polyether polyol (C2) had a hydroxyl value of 669 mg KOH/g, a number average molecular weight of 350, an average number of hydroxyl groups of 2.2 and a viscosity at 25° C. of 223 mPa·s.

(Manufacturing of Rigid Polyurethane Foam)

A resin premix was prepared in the same manner as in Example 1 except that the polyether polyol (1) was replaced by 100 parts of the polyether polyol (C2). The resin premix was combined with 230.5 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a polyurethane foam. However, the polyurethane foam shrunk and changed shape when allowed to stand in a thermohygrostat at 23° C. and 50% humidity.

Comparative Example 3

(Preparation of Polyether Polyol)

A flask equipped with a distillation column and a condenser was charged with 250 g of glycerin (30 mol % relative to all the alcohols), 675 g of dipropylene glycol (70 mol % relative to all the alcohols) and 23.7 g of potassium carbonate. They were dehydrated and condensed at a temperature of 240° C. and a pressure of 101 kPa for 24 hours to afford a polyether polyol (C3).

The polyether polyol (C3) had a hydroxyl value of 351 mg KOH/g, a number average molecular weight of 606, an average number of hydroxyl groups of 2.6 and a viscosity at 25° C. of 57300 mPa·s.

(Manufacturing of Rigid Polyurethane Foam)

A resin premix was prepared in the same manner as in Example 1 except that the polyether polyol (1) was replaced by 100 parts of the polyether polyol (C2). The resin premix was combined with 150.7 parts of polymeric MDI (M-200 manufactured by MITSUI CHEMICALS POLYURETHANES INC.) and mixed therewith in a dynamic mixer. The mixture liquid was then poured into a 200 mm×200 mm×200 mm free foaming box and afforded a polyurethane foam. However, the polyurethane foam shrunk and changed shape when allowed to stand in a thermohygrostat at 23° C. and 50% humidity.

The results of Examples and Comparative Examples above are set forth in Tables 1 and 2.

TABLE 1

| Ex. | 1 | 2 | 3 | 4 | 5 | 6 | 7 |
|---|---|---|---|---|---|---|---|
| Glycerin [mol %] | 70 | 70 | 70 | 70 | 70 | 90 | 90 |
| Other polyol (type)/[mol %] | DPG/30 | DPG/30 | DPG/30 | TEG/30 | TEG/30 | TEG/10 | TEG/10 |
| Polyol addition mode | Subsequent | Subsequent | Subsequent | Collective | Collective | Collective | Collective |
| Reaction time [h] | 57 | 24 | 31 | 24 | 8 | 3 | 2 |
| Hydroxyl value [mg KOH/g] | 673 | 833 | 770 | 445 | 765 | 842 | 967 |
| Number average molecular weight | 808 | 566 | 694 | 637 | 532 | 741 | 696 |
| Average number of hydroxyl groups | 5.1 | 4.0 | 4.7 | 3.2 | 3.6 | 5.3 | 5.3 |
| Viscosity (25° C.) [mPa·s] | 24000 | 7700 | 9440 | 11000 | 1245 | 85600 | 24100 |
| Residual glycerin [wt %] | 0.3 | 0.4 | 0.4 | 0.4 | 0.5 | 0.3 | 0.5 |

| Ex. | 8 | 9 | 10 | 11 | 12 | 13 |
|---|---|---|---|---|---|---|
| Glycerin [mol %] | 59 | 59 | 50.1 | 70 (crude) | 95 | 70 |
| Other polyol (type)/[mol %] | DEG/41 | DEG/41 | DEG/49.9 | DPG/30 | PEG 400/5 | Isosorbide/30 |
| Polyol addition mode | Collective | Collective | Collective | Subsequent | Collective | Collective |
| Reaction time [h] | 34 | 57 | 55 | 70 | 3 | 6 |
| Hydroxyl value [mg KOH/g] | 567 | 463 | 515 | 662 | 778 | 937 |
| Number average molecular weight | 768 | 730 | 669 | 831 | 697 | 432 |
| Average number of hydroxyl groups | 4.4 | 3.7 | 3.7 | 5.1 | 4.8 | 3.2 |
| Viscosity (25° C.) [mPa·s] | 10900 | 24900 | 6860 | 24800 | 35500 | 39400 |
| Residual glycerin [wt %] | 0.2 | 0.2 | 0.2 | 0.4 | 0.3 | 0.4 |

TABLE 2

|  | 14 | 15 | 16 | 17 | 18 | 19 |
|---|---|---|---|---|---|---|
| Glycerin [mol %] | 70 | 70 | 70 | 70 | 70 | 70 |
| Other polyol (type)/[mol %] | DEG/30 | DEG/30 | DEG/30 | DEG/30 | DEG/30 | DEG/30 |
| Polyol addition mode | Collective | Collective | Collective | Collective | Collective | Collective |
| Reaction time [h] | 44 | 48 | 22 | 56 | 32 | 57 |
| Hydroxyl value [mg KOH/g] | 675 | 703 | 801 | 639 | 594 | 662 |
| Number average molecular weight | 1042 | 747 | 710 | 849 | 934 | 748 |
| Average number of hydroxyl groups | 6.6 | 4.9 | 4.9 | 5.2 | 5.5 | 4.7 |
| Viscosity (25° C.) [mPa·s] | 10680 | 18650 | 4100 | 17580 | 22960 | 5100 |
| Residual glycerin [wt %] | 0.4 | 0.3 | 0.4 | 0.3 | 0.3 | 0.5 |

|  | 20 | 21 | 22 | Comp. Ex. 1 | Comp. Ex. 2 | Comp. Ex. 3 |
|---|---|---|---|---|---|---|
| Glycerin [mol %] | 80 | 60 | 70 | 100 | 0 | 30 |
| Other polyol (type)/[mol %] | DEG/20 | DEG/40 | DEG/30 | — | DPG/100 | DPG/70 |
| Polyol addition mode | Collective | Collective | Collective | Collective | Collective | Collective |

TABLE 2-continued

| | | | | | | |
|---|---|---|---|---|---|---|
| Reaction time [h] | 27 | 27 | 22 | 5 | 37 | 24 |
| Hydroxyl value [mg KOH/g] | 681 | 678 | 769 | 868 | 669 | 351 |
| Number average molecular weight | 836 | 669 | 661 | 873 | 350 | 606 |
| Average number of hydroxyl groups | 5.3 | 4.3 | 4.5 | 6.3 | 2.2 | 2.6 |
| Viscosity (25° C.) [mPa·s] | 28920 | 2220 | 4890 | 200000 | 223 | 57300 |
| Residual glycerin [wt %] | 0.6 | 0.9 | 0.9 | — | — | — |

INDUSTRIAL APPLICABILITY

The polyether polyols according to the present invention have low viscosity and are suitably used as materials for rigid polyurethane foams. The rigid polyurethane foams produced using the polyether polyols are useful as thermal insulating materials for building panels, refrigerators, freezers, pipes and the like, and as structure support materials for houses, vehicles and the like.

The invention claimed is:

1. A polyether polyol obtained by dehydration condensation of glycerin and monohydric and/or dihydric alcohol with the glycerin percentage being in the range of more than 50 mol % to not more than 95 mol % relative to 100 mol % of the total of the glycerin and alcohol,
wherein the polyether polyol has a hydroxyl value of 200 to 1200 mg KOH/g and a viscosity at 25° C. of not more than 50000 mPa·s.

2. The polyether polyol according to claim 1, which has an average number of hydroxyl groups per molecule of not less than 3.

3. The polyether polyol according to claim 1, wherein the glycerin is crude glycerin obtained by hydrolysis or alcoholysis of natural fat and oils.

4. A process for producing the polyether polyols described in claim 1, which comprises dehydration condensing glycerin and monohydric and/or dihydric alcohol with the glycerin percentage being in the range of more than 50 mol % to not more than 95 mol % relative to 100 mol % of the total of the glycerin and alcohol.

5. A process for producing the polyether polyols described in claim 1, which comprises dehydration condensing glycerin to produce a condensate, and dehydration condensing the condensate and monohydric and/or dihydric alcohol with the glycerin being used at a percentage in the range of more than 50 mol % to not more than 95 mol % relative to 100 mol % of the total of the glycerin and alcohol.

6. The process for producing the polyether polyols according to claim 4 or 5, wherein the glycerin is crude glycerin obtained by hydrolysis or alcoholysis of natural fat and oils.

7. A rigid polyurethane foam obtained by reacting a polyol component comprising the polyether polyol of claim 1 and a polyisocyanate in the presence of a catalyst, a foaming agent and a foam stabilizer.

8. A rigid polyurethane foam obtained by reacting a polyol component comprising the polyether polyol of claim 3 and a polyisocyanate in the presence of a catalyst, a foaming agent and a foam stabilizer.

9. A process for producing rigid polyurethane foams, which comprises reacting a polyol component comprising the polyether polyol of claim 1 and a polyisocyanate in the presence of a catalyst, a foaming agent and a foam stabilizer.

10. A process for producing rigid polyurethane foams, which comprises reacting a polyol component comprising the polyether polyol of claim 3 and a polyisocyanate in the presence of a catalyst, a foaming agent and a foam stabilizer.

* * * * *